United States Patent [19]
Kikuchi et al.

[11] Patent Number: 4,495,600
[45] Date of Patent: Jan. 22, 1985

[54] TABULATION SYSTEM

[75] Inventors: Yoshiyasu Kikuchi; Masamichi Shutoh; Hitoshi Miyai; Hidetoshi Itoh, all of Tokyo, Japan

[73] Assignee: Nippon Electric Co., Ltd., Tokyo, Japan

[21] Appl. No.: 508,577

[22] Filed: Jun. 28, 1983

Related U.S. Application Data

[63] Continuation of Ser. No. 190,927, abandoned.

[30] Foreign Application Priority Data

Sep. 28, 1979 [JP] Japan ................. 54-124967
Oct. 2, 1979 [JP] Japan ................. 54-127621
Oct. 5, 1979 [JP] Japan ................. 54-129210

[51] Int. Cl.[3] ............... G06F 7/00; G06F 3/14; B41J 21/00
[52] U.S. Cl. ................. 364/900; 340/723; 400/279
[58] Field of Search ........ 340/723, 724, 734; 364/200, 900; 400/279

[56] References Cited
U.S. PATENT DOCUMENTS 3,914,745 10/1975 Cooper et al. ............... 364/900
3,952,852 4/1976 Greek, Jr. et al. ............ 400/279
4,212,553 7/1980 Acosta et al. ............... 400/279
4,240,758 12/1980 Acosta ....................... 400/279
4,291,305 9/1981 Kimura et al. ............... 340/734

OTHER PUBLICATIONS

"Design of a Raster Display Processor for Office Applications", by David Hartke et al., IEEE Trans. on Canp., vol. C-27, No. 4, 4/1978, pp. 337 to 338.

Primary Examiner—Eddie P. Chan
Attorney, Agent, or Firm—Charles E. Pfund

[57] ABSTRACT

A tabulation system for delivery to a medium of data information suitably arranged for tabulation of character series and ruled lines, and a control for controlling the data information arrangement applied to the medium. The control operates to allow the medium to sequentially deliver out control information for defining desired vertical ruled lines (columns), information regarding a horizontal ruled line (row) defining the upper side of a field between adjacent vertical ruled lines, information regarding character series to be written in the field and control commands for the writing, and information regarding a horizontal ruled line defining the lower side of the field.

4 Claims, 13 Drawing Figures

|   | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|----|----|----|----|----|----|----|----|----|----|----|
| 1 | X₁ | X | X |   |   |   | X₂ | X | X |   |   | X₃ | X | X |   |   | X₄ | X |   |   |
| 2 | X₅ | X | X | X |   |   | X₆ | X | X | X |   | X₇ | X | X | X |   | X₈ | X |   |   |
| 3 |   | X | X |   |   |   |   | X | X |   |   |   | X | X | X |   |   |   |   |   |
| 4 |   |   |   |   |   |   |   |   |   |   |   |   | X | X | X |   |   |   |   |   |
| 5 |   | X₉ | X | X |   |   | X₁₀ | X | X | X |   | X | X | X₁₁ | X |   | X | X |   |   |
| 6 |   |   |   |   |   |   |   | X | X | X |   |   |   |   |   |   |   |   |   |   |

FIG.9

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 01 | [VL] | 03 | [VL] | 07 | [VL] | 12 | [VL] | 16 | [VL] | 19 | [END] | HL | [TAB] | X₁ | X | X | [TAB] | X₂ | X | X |
| 21 | X | [TAB] | X₃ | X | X | [TAB] | X₄ | X | [END] | HL | [TAB] | X₅ | X | X | X | X | [TAB] | X₆ | X |   |
| 41 | X | X | X | X | X | [TAB] | X₇ | X | X | X | X | X | X | X | X | X | [TAB] | X₈ |   |   |
| 61 | X | [END] | HL | [VD] | 12 | [VL] | 14 | [VD] | 16 | [END] | [TAB] | X₉ | X | X | X | [TAB] | X₁₀ | X | X | X |
| 81 |   | X | X | X | X | X | [TAB] | X₁₁ | X | X | X |   |   |   |   |   |   |   |   |   |

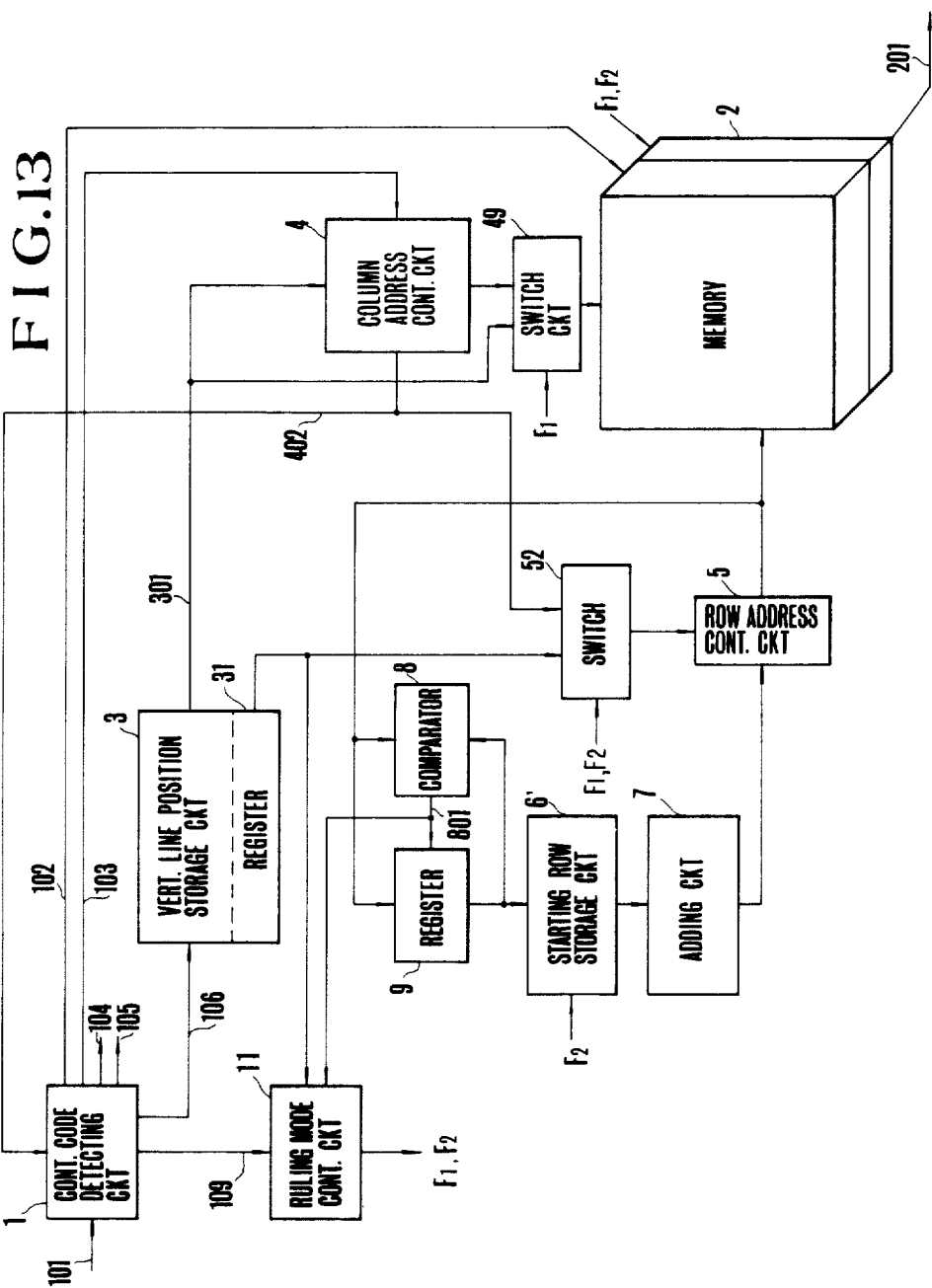

TABULATION SYSTEM

This is a continuation of application Ser. No. 190,927 filed Sept. 26, 1980, now abandoned.

BACKGROUND OF THE INVENTION

The present invention relates to a tabulation system for use in a word processor, and particularly to a tabulation system which receives character strings including tabulation control codes, and arrays input characters appropriately in a plurality of fields partitioned by horizontal and vertical lines (ruled lines).

The data format in a word processor is different from items and records in conventional EDP systems, and a data in the form of a long, variable-length character string must be handled. The reason is that individual sentences have indefinite length and the length can vary by insertion and deletion of words, in contrast to conventional EDP data in which the data length is definite for the commodity name, quantity, and so on. Therefore, in the case of tabulation where input character strings are arrayed in a plurality of fields partitioned by horizontal and vertical lines, it is necessary to prevent the input character strings being arrayed from acrossing the lines.

Conventional word processors have tabulation capabilities such as so called Tab function which is effective within one row. Thus, a character string which has been started to align toward the ith Tab position continues to align even if the i+1th Tab is detected, and it is not possible to realign by automatically returning from the ith Tab position on the next row when the i+1th Tab is detected. The prior art tabulation function, works effectively for EDP data where the maximum number of characters in each field can be defined, in cooperation with the decimal Tab function which locates the decimal point automatically and the centering function which arranges a character string in the middle of the field. However, in the case of tabulation of explanatory description which is widely adopted in technical documents, the operator is required to make a new line at the boundary of the field. Particularly, the prior art system disadvantageously needed a very complex manipulation of data for rearrangement of character strings upon insertion and deletion of words.

SUMMARY OF THE INVENTION

It is an object of the present invention to provide a tabulation system which is free from the above-mentioned disadvantages, having a function wherein a character string is started to align to the ith vertical line position (equivalent to a Tab) and when the i+1th vertical line position is detected the character string continues to align to the ith vertical line position of the next row, and so on, and a function wherein the position corresponding to a maximum of rows which have been filled with information is so determined by horizontal line position information as to be for a horizontal ruled line, so that the starting row position of the subsequent fields is determined automatically.

According to the present invention, characters are arrayed automatically so as to tabulate explanatory descriptions as widely adopted in technical documents, while ensuring insertion and deletion of characters with minimum operator intervention.

BRIEF DESCRIPTION OF THE DRAWINGS

Other objects, features and advantages of the present invention will become apparent from the following description taken in conjunction with the accompanying drawings, in which:

FIGS. 1 and 8 illustrate tables showing data which can be arranged by a tabulation system according to the present invention;

FIGS. 2 and 9 are examples of character strings including tabulation and ruling control information for preparing tables shown in FIGS. 1 and 8, respectively;

FIGS. 12 and 13 are block diagrams showing modifications of FIGS. 10 and 11, respectively.

DESCRIPTION OF PREFERRED EMBODIMENT

Figures 1, 2:
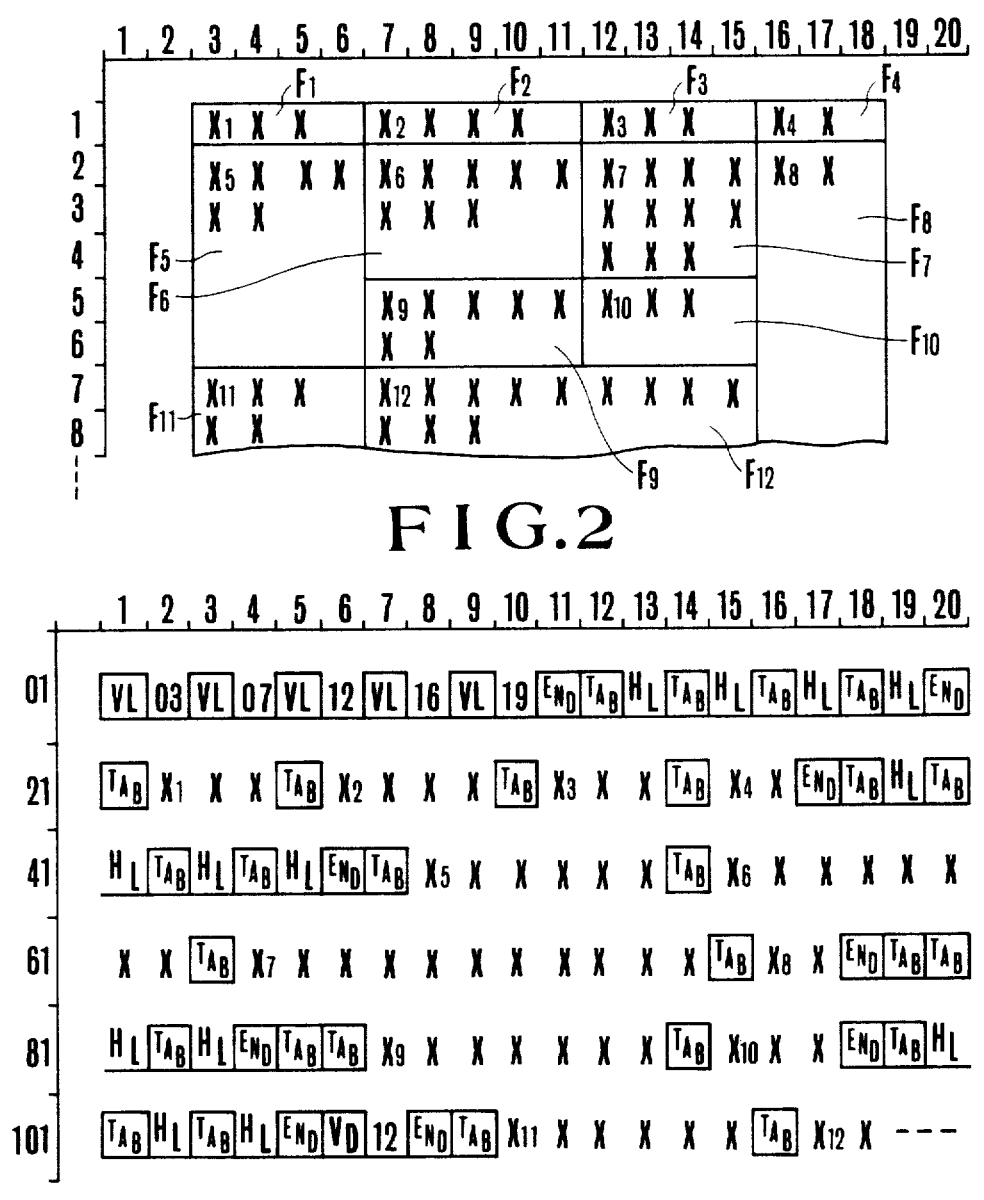
Figure 3:
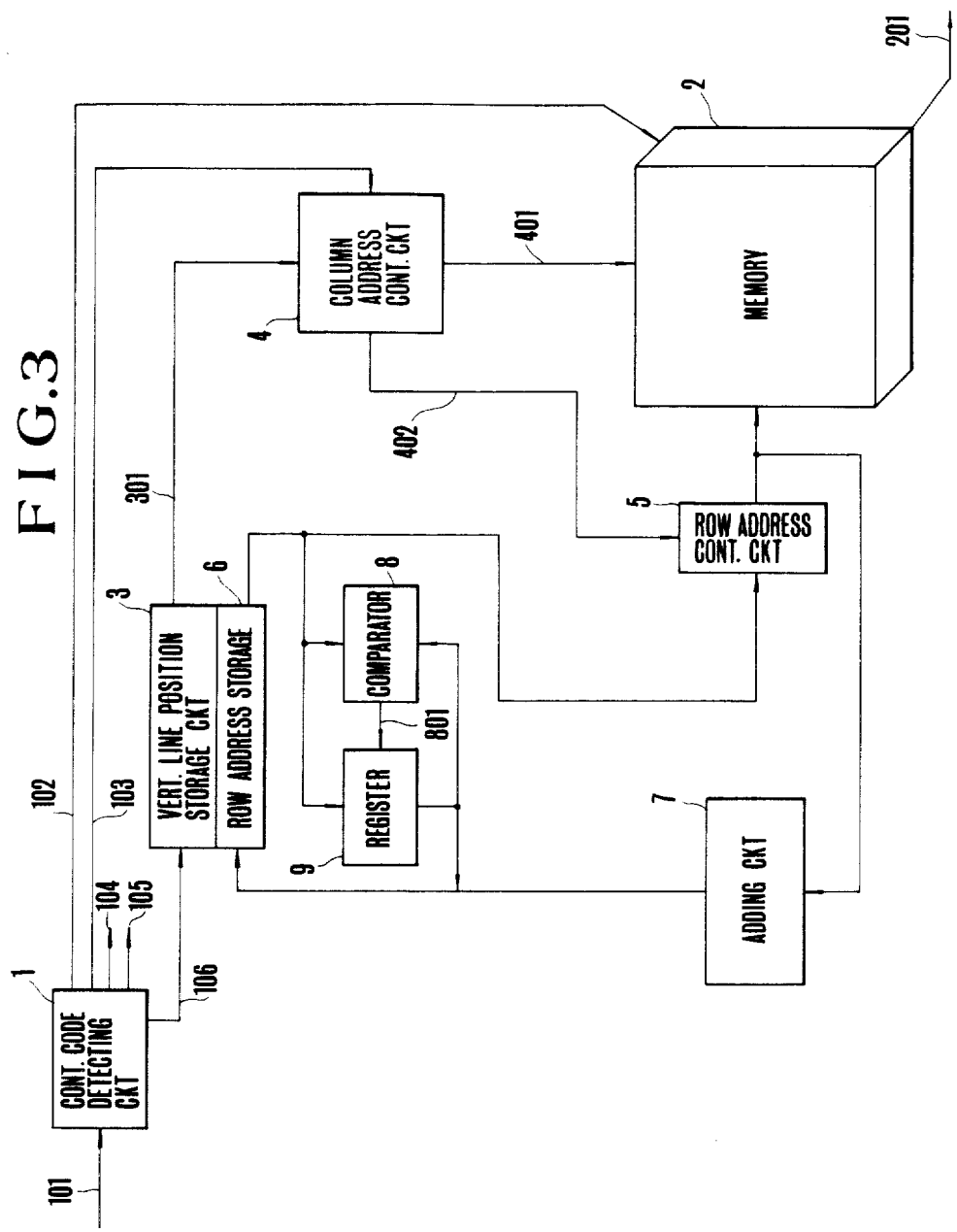
FIG. 3 is a block diagram of a tabulation system embodying the present invention corresponding to the table in FIG. 1.

FIG. 1 is an illustration showing an example of table which can be arranged by a tabulation system according to the present invention, where 12 groups of characters, $X_1XX$, $X_2XXX$, and so on, are arrayed in fields $F_1$ to $F_{12}$ partitioned by ruled lines. For purposes of explanation there is shown in this example a table of 20 columns by 8 rows. However, practical tables have usually a greater number of columns and rows. Horizontal and vertical lines may be ruled by hand after characters in fields $F_1$ to $F_{12}$ have been printed, or they may be displayed or printed by generating ruling information as will be supplemented in this embodiment. For convenience a horizontal line is ruled at the top side of each row and a vertical line is ruled at the left side of each column.

FIG. 2 is an illustration showing character strings including control information for tabulation and ruling, which are entered for preparing the table of FIG. 1 according to the tabulation system of this invention. The representation "VL" in the first character position indicates that the subsequent numeric representation signifies the vertical line position. Thus, information in the 1st to 10th character positions indicates that vertical lines are ruled in columns 3, 7, 12, 16, and 19. The representation "END" in the 11th character position is the partition code, indicating that a subsequent "TAB" code next to the "END" corresponds to the extreme left vertical line. The "TAB" and "HL" codes in the 12th and 13th character positions indicate that a horizontal line is ruled from the extreme vertical line to the second vertical line, i.e. from column 3 to column 7. In the same way, information ranging from "TAB" in the 14th character position to "END" in the 20th character position rules a horizontal line from column 7 to column 18 on row 1 of the table in FIG. 1. Next, the extreme left vertical line (i.e. the column 3) is pointed again by the TAB code in the 21st character position, and character string $X_1XX$ is arrayed in field $F_1$ starting from that column. The second vertical line from the left (i.e. column 7) is pointed by the TAB code in the 25th character position, and character strings up to the END code in the 37th character position are arrayed in fields $F_2$ to $F_4$. The "TAB" codes and "HL" codes in the 38th to 45th character positions rule a horizontal line on row 2 in a similar manner to the horizontal line ruling information in the 12th to 19th character positions. Character string $X_5XXXXX$ to be arrayed in field $F_5$ given by information following the TAB code in the 47th character position starts aligning from the extreme left vertical line (i.e. column 3) on row 2, and when the second vertical line from the left is reached (arrayed up to column 6), the remaining portion of the character string is arrayed from column 3 on row 3. Character string $X_6XX$ . . . to be arrayed in field $F_6$ given by information following the TAB code in the 54th character position is arrayed in columns 7 to 11 on row 2, and the remaining portion is arrayed on row 3. In the same fashion, character string $X_7XX$ . . . to be arrayed in field $F_7$ given by information following the TAB code in the 63rd character position is arrayed in columns) 12 to 15 on rows 2 to 4, sequentially. The character string of field $F_8$ given by information following the TAB code in the 75th character position can be arrayed on the single row. The TAB code in the 79th character position following the END code in the 78th character position signifies the extreme left vertical line (i.e. column 3) and the TAB code in the 80th character position signifies the second vertical line from the left (i.e. column 7). Since no information is given between the TAB codes in the 79th and 80th character positions, there is neither character string to be arrayed nor ruled line between these vertical lines.

The HL, TAB, HL, and END codes starting from the 81st character position indicate that a horizontal line is ruled from the second vertical line from the left (i.e. column 7) to the fourth vertical line (i.e. column 16) through the third vertical line (i.e. column 12). In this case, the vertical position (i.e. the row number) of the horizontal line is determined by calculation such that the horizontal line is ruled next to the largest row number of the last rows in the fields (i.e. fields $F_6$ and $F_7$) arrayed between the vertical lines across which the horizontal line is to be ruled (i.e. between the second and fourth vertical lines). Accordingly, the horizontal line in question is ruled on row 5.

By the two TAB codes in the 85th and 86th character positions, character string $X_9XX$ for field $F_9$ is arrayed between the second and third vertical lines on rows 5 and 6, and by the TAB code in the 94th character position, the character string for field $F_{10}$ is arrayed between the third and fourth vertical lines on row 5. Three sets of TAB and HL codes in the 98th to 104th character positions signify that a horizontal line is ruled from the extreme left vertical line to the third vertical line, with its vertical position being determined by the maximum row number of the last rows in fields immediately preceding the horizontal line to be ruled across the vertical lines (i.e., fields $F_5$ $F_9$ and $F_{10}$). In this case, the maximum row number is 6 in field $F_6$, and thus the horizontal line is ruled on row 7.

The VD code in the 106th character position signifies that the vertical line indicated by the subsequent numeric code "12" is to be deleted, and the third vertical line within field $F_{12}$ is changed from column 12 to column 16, while the second vertical line is left unchanged.

FIG. 3 is a block diagram of an example of a tabulation system according to the present invention, especially for the tabulation of FIG. 1 but without ruling. The tabulation system comprises a medium for delivery of data information suitably arranged for tabulation of character series and ruled lines, and means for controlling the data information arrangement applied to the medium. The medium is exemplified as a memory in the following embodiments, but the controlling means may directly drive a medium in the form of a printer. A control code detecting circuit 1 reads out control codes END, TAB and VL onto lines 104, 105 and 106, respectively, from the serial input code signal received on line 101. Character strings are sent over line 102 to a medium such as a memory 2, with their synchronization signal transmitted on line 103. The memory 2 stores information regarding characters and ruling lines in a 2-dimensional scheme. A vertical line position storage circuit 3 is a group of registers, storing column numbers following each control code VL which sets the vertical line position. It is possible to delete any of stored column numbers using the control code VD which deletes a vertical line position. The number of registers must be larger than the maximum number of vertical line positions which can possibly be designated, and 16 or 32 registers will preferably be used in practice. After vertical line positions have been stored, the vertical line position storage circuit 3 outputs, to a column address control circuit 4 via line 301, the extreme left vertical line position each time the control code END in the input character string is detected, and then the second, third, and so on, vertical line positions sequentially each time the control code TAB in the input character string is detected.

The column address control circuit 4 generates addresses for the memory 2 corresponding to column positions which participate in arraying an input character string for tabulation between vertical lines partly defining a desired field. The column address control circuit 4, which will be described in detail with reference to FIG. 4, stores the left and right vertical lines of a field in which the character string is being arrayed, and generates column addresses sequentially starting from the left-hand vertical line position to the right-hand vertical line position minus 1, repeatedly in synchronization with the input character string. The column address control circuit 4 also sends a new line signal to a row address control circuit 5 via line 402 each time addressing returns to the left-hand vertical line position. In this procedure, when the control code TAB is detected, a new column number of a vertical line position sent from the vertical line position storage circuit 3 is set to the address of the right-hand vertical line position of the next field, and the address of the right-hand vertical line position of the previous field is shifted to the address of the left-hand vertical line position of the next field. The row address control circuit 5 generates addresses for the memory 2 corresponding to row positions of a table to be tabulated, with the starting row of each field being set by a row address storage circuit 6, which will be described later. The row address in the circuit 5 is then incremented by one each time the above-mentioned new line signal is sent from the column address control circuit 4. When the control codes TAB and END are detected, the row address from the row address control circuit 5 is added with a predetermined number of line spacings (1 for example) by an adding circuit 7, and the result is sent to the row address storage circuit 6. The row address storage circuit 6 is a group of registers similar to the vertical line position storage circuit 3, and writes and reads addresses in response to the control signals END and TAB. Thus, the row address added by the predetermined line spacings (e.g. 1) is stored corresponding to individual vertical line positions, and the row address which has been written corresponding to the next vertical line position is sent to the row address control circuit 5 as the starting row of the next field so that the row address is generated.

When the control code HL is detected following the code TAB, a maximum row address circuit made up of a comparator 8 and a register 9 compares row addresses sent from the row address storage circuit 6 (containing the last row numbers plus 1 of each field) to find the largest row address, and stores it in the register 9. That is, signals from the row address storage circuit 6 and register 9 are compared, and the contents of register 9 are updated by a signal on line 801 only if the former is larger than the latter, so that the maximum row address is obtained. Next, after the END code has been detected, the contents of registers in the row address sotrage circuit 6 corresponding to the field in which the HL code has been detected are replaced with the maximum row address indicated by register 9.

As described above, it is possible to array and store, in a tabulation format, character strings received on line 101 in the memory 2 (1 byte (=8 bits)/address) by using addresses from the column address control circuit 4 and row address control circuit 5. The contents of memory 2 are read out by scanning starting from the top left corner (the scanning circuit is not shown), so that character strings in complete tabulation format are sent out in serial fashion over line 201 to a conventional printer or display unit.

Figure 4:
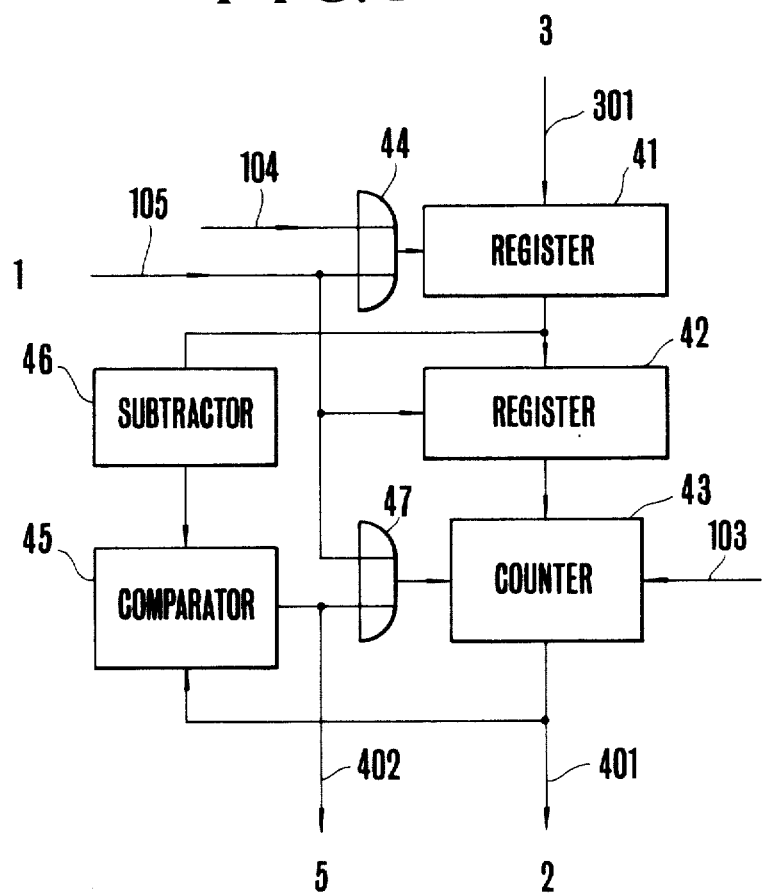
FIG. 4 is a detailed block diagram of column address control circuit of FIG. 3.

FIG. 4 is a block diagram showing in detail the column address control circuit 4 of FIG. 3. In the block diagram, the leftmost vertical line position sent from the vertical line position storage circuit 3 over line 301 is set to a register 41 in synchronization with an END signal on line 104 from the control code detecting circuit 1. Next, when the TAB signal is sent from the control code detecting circuit 1 over line 105, the contents of register 41 are transferred to register 42 and, at the same time, set to a counter 43, and then a vertical line position second to the leftmost vertical line is sent over line 301 and set to the register 41. The END signal and TAB signal are ORed by an OR gate 44. The contents of registers 41 and 42 are transferred each time a TAB signal is received, so that the left-hand vertical line position of a field is stored in register 42, and the right-hand vertical line position of the field is stored in register 41.

The counter 43 is incremented by one by the synchronization signal (line 103) for the character string which is sent from the control code detecting circuit 1. The counter output is sent to the memory 2 over line 401 and, at the same time, compared with the output of register 41 which is subtracted by 1 by means of a subtractor 46. An equal comparative result signifies that a character string has been arrayed up to the right-hand vertical line position minus one column, and a signal is sent to the row address control circuit 5 over line 402 and, at the same time, the contents of register 42 is set to the counter 43. Signals on lines 105 and 402 are ORed by an OR gate 47.

Operation of the block diagram shown in FIGS. 3 and 4 in handling input character strings of FIG. 2 for tabulation shown in FIG. 1 will further be described as follows. The control code detecting circuit 1 detects the VL codes in the 1st, 3rd, 5th, 7th, and 9th character positions, and transmits subsequent numeric codes "03", "07", "12", "16", and "19" in the 2nd, 4th, 6th, 8th, and 10th character positions respectively, to the vertical line position storage 3 sequentially and stores them in the 0th to 4th registers. Subsequently, the circuit 1 also sends a signal corresponding to an END code in the 11th character position, which signifies that the last vertical line position has been read in to the vertical line position storage circuit 3, so that the 4th register is marked.

In order to provide a general explanation, operation is skipped up to the END code in the 46th character position. When the END code in the 46th character position is detected the contents of the 1st register (i.e. "03") in the vertical line position storage 3 is transferred to the column address control circuit 4, and when the TAB code in the 47th character position is detected, the contents of the 2nd register (i.e. "07") is transferred to the column address control circuit 4. Accordingly, the contents of the counter 43 in the column address control circuit 4 become "03". Consequently, when character $X_5$ in the 48th character position is read, it is stored in the memory 2 which is addressed "03" by the column address control circuit 4 and "02" by the row address control circuit 5. It should be noted that the 1st to 4th registers in the row address storage circuit 6 and register 9 contain "02". Next, counter 43 is advanced by 1 by the synchronization signal on line 103, causing the contents of the column address control circuit 4 to become "04", and the next character in the 49th character position is read into an adjacent, right address of the memory 2. When the character string has been read up to the 51st character position, comparator 45 transmits a signal indicating that the contents of register 41 minus 1, (i.e. "06") is equal to the contents of counter 43, and the contents of register 42 (i.e. "03") is set to counter 43 again.

At the same time, the row address control circuit 5 is incremented by 1 to become "03" by the signal on line 402. Accordingly, a character in the 52nd character position is written to column 03, row 03 of memory 2, that is, on the next row beneath character $X_5$ in the 48th character position. In the same way, a character in the 53rd character position is written to column 04, row 03.

Next, when the TAB code in the 54th character position is detected, the current contents of the row address control circuit 5 (i.e. "03") is incremented by 1 by the adding circuit 7 and the result "04" is stored in the 1st register in the row address storage circuit 6. Next, row address "02" for the next field is read out of the 2nd register and set to the row address control circuit 5, and at the same time, the contents of the 3rd register (i.e.. "12") are sent from the vertical line position storage circuit 3 to register 41 in the column address circuit, and the old contents of register 41 (i.e. "07") are transferred to register 42 and set to counter 43. The subsequent eight characters starting from the 55th character position for field $F_6$ are stored sequentially in row 02, columns 07, 08, 09, 10 and 11; and row 03, columns 07, 08 and 09 of memory 2. When the TAB code in the 63rd character position is detected, the current contents of the row address control circuit 5 (i.e "03") is added by 1 by adding circuit 7, and the result "04" is written to the 2nd register of the row address storage circuit 6. In the same way, 11 characters starting from the 64th character position for field $F_7$ are stored in row 02, columns 12, 13, 14 and 14; row 03, columns 12, 13, 14 and 15; and row 04, columns 12, 13 and 14 of the memory 2. When the TAB code in the 75th character position is detected, the current contents of the row address control circuit 5 (i.e. "04") is added by 1 by adding circuit 7, and the result "05" is written to the 3rd register of the row address storage circuit 6. Furthermore, two characters starting from the 76th character position for field $F_8$ are sequentially stored in row 02, columns 16 and 17 of memory 2. When the END code in the 78th character position is detected, the current contents of the row address control circuit 5 (i.e. "02") is added by 1 by adding circuit 7, and the result "03" is written to the 4th register of the row address storage circuit 6. This END code causes the vertical line position storage circuit 3 to be reset to the 0th register, and the 2nd register of the row address storage circuit 6 is designated when the register of the vertical line position storage circuit 3 is changed to the 1st register by the TAB code in the 79th character position and to the 2nd register by the TAB code in the 80th character position. Accordingly, when the HL code in the 81st character position is detected, the contents of the 2nd register (i.e. "04") of the row address storage circuit 6 is read out and compared with the contents of register 9 by comparator 8. Since the contents of the register 9 are smaller than the contents of the 2nd register, the latter is written to the register 9. When the TAB code in the 82nd character position is detected, the 3rd register of the row address storage circuit 6 is designated. When the HL code in the 83rd character position is detected, the contents of the 3rd register (i.e. "05") is read out and compared with the contents of register 9 by comparator 8, then the register 9 is updated to "05". When the END code in the 84th character position is detected, the contents of the 2nd and 3rd registers of the row address storage circuit 6 are replaced with the maximum value in register 9 (i.e. "05"). The contents of the 3rd register has been changed to "05" before replacement operation takes place, however, it is not treated separately. It can be seen from the above explanation that the contents of the 1st to 4th registers of the row address storage circuit 6 and register 9, at a time immediately before detecting the TAB code in the 47th character position, have been changed to "02" through the processing of the character string from the 38th to 46th character positions. For starting tabulation, register 9 is set to "1" for the first row, and for renewal of the page, all registers of the row address storage circuit are reset to "00". Accordingly, when a character string to be arrayed between the first and second vertical line positions, i.e. between columns 03 and 07, is read in, it is started to align on row 04; when character strings to be arrayed between the second and third, and between the third and fourth vertical line positions are read in, they are started to align on row 05; when a character string to be arrayed between the fourth and fifth vertical line positions is read in, it is started to align on row 03. In the example shown in FIG. 2 array is skipped between the first and second vertical line positions due to the TAB codes in the 85th and 86th character positions, and a character string starting from the 87th character for field $F_9$ and a character string starting from the 95th character position for field $F_{10}$ are stored between the second and third vertical line positions and the third and fourth vertical line positions, respectively, starting from row 05. The END code in the 98th character position causes an array to be skipped between the fourth and fifth vertical line positions.

Figure 5:
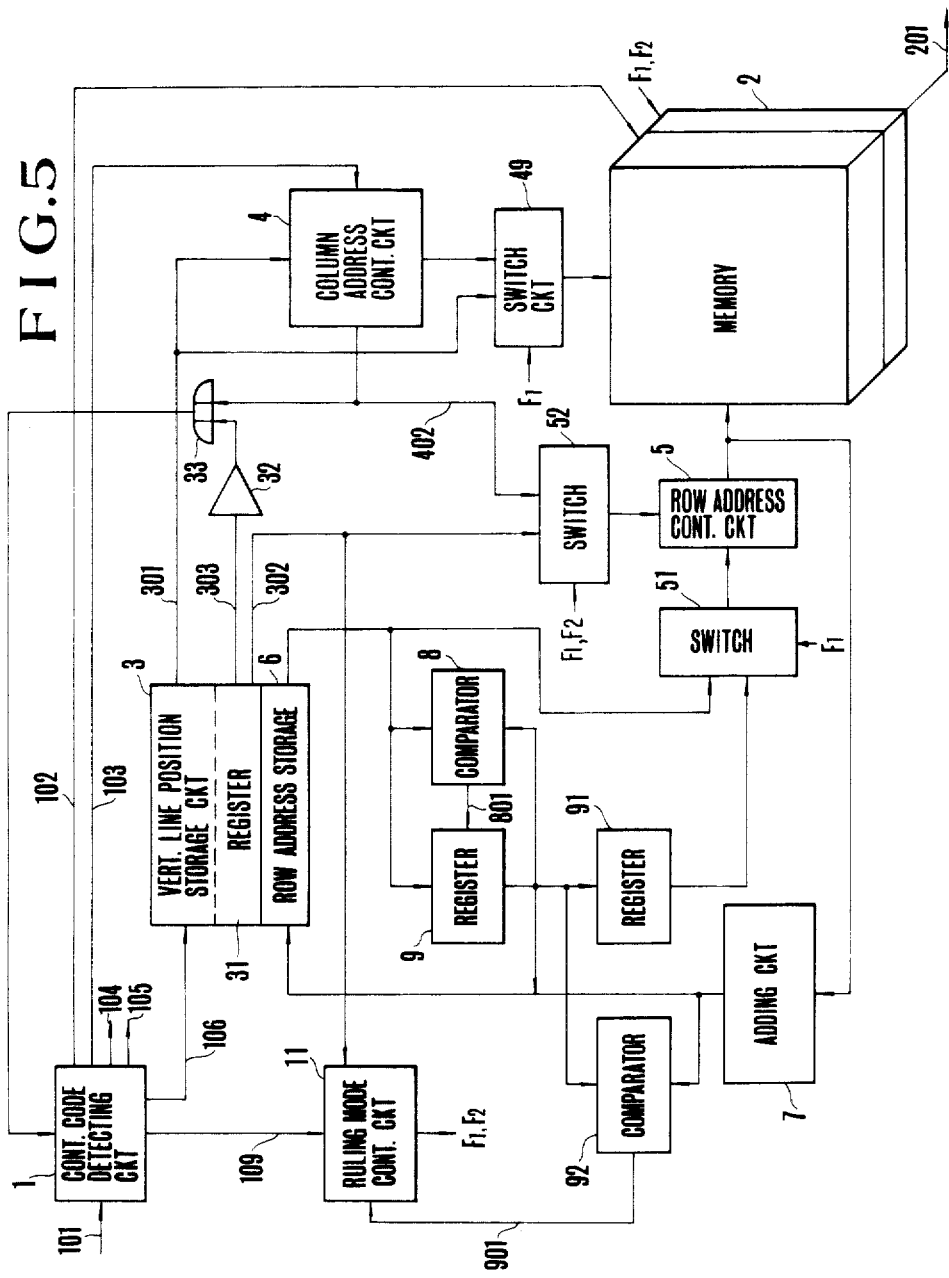
FIG. 5 is a block diagram based on that of FIG. 3 and added by the circuitries necessary for generating ruled lines shown in FIG. 1.

Ruled line generation will now be described with reference to FIG. 5, which is based on FIG. 3 and supplemented added by the circuitries for ruled line generation. In FIG. 5, a register 31 for storing the end mark signal and reading out the signal over line 302, for storing HL code signals corresponding to each vertical line position and reading out the signals over line 303 are added to the vertical line position storage circuit 3.

Operation of ruled line generation is as follows. First, ruling mode control circuit 11 which consists of two flipflops and a gate circuit receives an END code which follows an HL code on line 104, and the 1st flipflop is set to bring the system into vertical ruling mode. A signal $F_1$ indicates that the first flipflop is set.

Column addresses of vertical lines are read out sequentially from the vertical line position storage circuit 3. Then, the left-hand input of a switch circuit 49 is selected and data on line 301 is directly used as column addresses for the memory 2.

On the other hand, the contents of register 91 is set to the row address control circuit 5 via a switch 51 as the initial row address. The register 91 contains data which has been stored in register 9 before it is replaced with the maximum address by the HL code. Count of row addresses of the row address control circuit 5 is carried out by switching from the usual line-spacing signal on line 402 to the end mark signal on line 302 which signifies the last data of the vertical line position storage circuit 3 by means of a switch 52. The row address starts from a row next to the row on which vertical line processing has been completed in the previous vertical ruling mode. The column address generates addresses of vertical line positions of each row sequentially, and advances the row address of the row address control circuit 5 by one each time the transfer of all vertical positions from the left edge to the right edge of the table is completed. This operation continues until comparator 92 detects that the row address of the row address control circuit 5 is equal to the contents of register 9 which contains the maximum row address and sends out a signal over line, 901. The signal on line 801 sets the second flipflop in the ruling mode control circuit 11, causing the system to enter horizontal ruling mode. A signal $F_2$ indicates that the second flipflop is set. In this mode, switches 49 and 51 are restored, and the contents of the vertical line position storage circuit 3 are transferred sequentially to the column control circuit 4 as usual. However, for a field between vertical line positions without HL code, the register 31 has no output, and the output of an inverter 32 is sent via OR gate 33 to the control code detecting circuit 1, which in turn produces a pseudo TAB signal on line 105, causing the field to be skipped so that no horizontal line is written into memory 2. In contrast, for a field including HL code, the control code detecting circuit 1 produces a pseudo synchronization signal on line 103. Therefore, the column address control circuit 4 generates column addresses starting from the left-hand vertical line position of the field to the right-hand vertical line position minus one column sequentially, while horizontal line information is written into memory 2. When addresses have been generated up to the right-hand vertical line position minus one column, a line-spacing signal appears on line 402, which is sent via OR gate 33 to the control code detecting circuit 1. Then, a pseudo TAB signal is produced, and the process proceeds to column address generation for the next field. The row address remains at the maximum row address which has been seen at the end of the vertical ruling mode. When all fields have been processed, the second flipflop of the vertical ruling mode control circuit 11 is cleared by the end mark signal on line 302 to terminate horizontal ruling mode, and usual character string array is restarted. For writing horizontal and vertical lines into memory 2, in this embodiment, 2-bit attribute data planes are added to the 8-bit, and logical "1" is written in each plane. Therefore, a write signal for the first plane is kept "1" in vertical ruling mode, and a write signal of the second plane is kept "1" in horizontal ruling mode.

Operational relation of the block diagram to the example of tabulation shown in FIGS. 1 and 2 is as follows.

Explanation will start from the TAB code in the 79th character position as a typical portion of the given character strings. Until this moment, data for horizontal lines on rows 1 and 2, and the first vertical line has been stored in memory 2. Accordingly, register 91 contains the maximum row address of the fields obtained when the horizontal line on row 2 has been processed, that is, address "02" transferred from the register 9. After the character string between the TAB code in the 79th character position and the END code in the 84th character position has been read, the maximum address of fields $F_6$ and $F_7$ (i.e. "05") is set to register 9. The END code in the 84th character position causes the first flipflop in the ruling mode control circuit 11 to be set, and the system is brought into vertical ruling mode. Then, the contents of register 91 (i.e. "02") is set to the row address control circuit 5. Next, the row address and all vertical line positions 03, 07, 12, 16 and 19 sent from the vertical line position storage circuit 3 write logical "1" into the first plane of memory 2 corresponding to the writing of a vertical line on row 02. The row address control circuit is incremented by 1 by the end mark signal sent over line 302 immediately following the vertical line position 19, and vertical lines on row 03 and row 04 are written by all vertical line positions. When vertical lines have been written up to row 04, the value "04" added by 1 becomes equal to the contents of register 9 (i.e. "05"). Thus, a comparator 92 operates to produce a signal on line 901, causing the first flipflop in the ruling mode control circuit 11 to be reset and the second flipflop to be set, and the system enters horizontal ruling mode. The vertical line positons 03 and 07 are again sent from the vertical line position storage circuit 3 to the column address control circuit 4. However, the leftmost field does not include HL code, and a pseudo TAB code signal is sent out from the control code detecting circuit 1.

Consequently, the next vertical line position "12" is sent from the vertical line position storage circuit 3 to the column address control circuit 4. The column address of memory 2 becomes "07" and the row address is kept at "05", and logical "1" is written into corresponding bit position of the second plane of memory 2. Consequently, the control code detecting circuit 1 sends out pseudo synchronization signals sequentially to change the column address in a sequence of 08, 09, 10 and 11, so that logical "1" is written into corresponding addresses. When the column address becomes "11", a line-spacing signal is produced on line 402, which causes the control code detecting circuit 1 to produce a pseudo TAB code signal again. Then, the next vertical line position "16" is sent from the vertical line position storage circuit 3, and horizontal ruling for the next field is processed. The rightmost field does not include HL code, and a pseudo TAB code signal is produced immediately, thus no horizontal line is written. An end mark signal is produced to clear the second flipflop in the ruling mode control circuit 11, and horizontal ruling mode is completed. Then, character string array for field 9 is started.

The topmost horizontal line is ruled as follows. When the starting row address for tabulation is initially set to registers 9 and 91 (the set signal is not shown), comparator 92 produces a signal indicating that the contents of register 9 are equal to the output of adding circuit 7 on line 901. Then, if an HL code is detected, the second flipflop in the ruling mode control circuit 11 is set, and the system enters horizontal ruling mode. Then, horizontal lines are ruled between vertical line positions sequentially and, at the same time, the contents of the row address storage circuit 6 is set to the row address of register 9.

Figure 6:
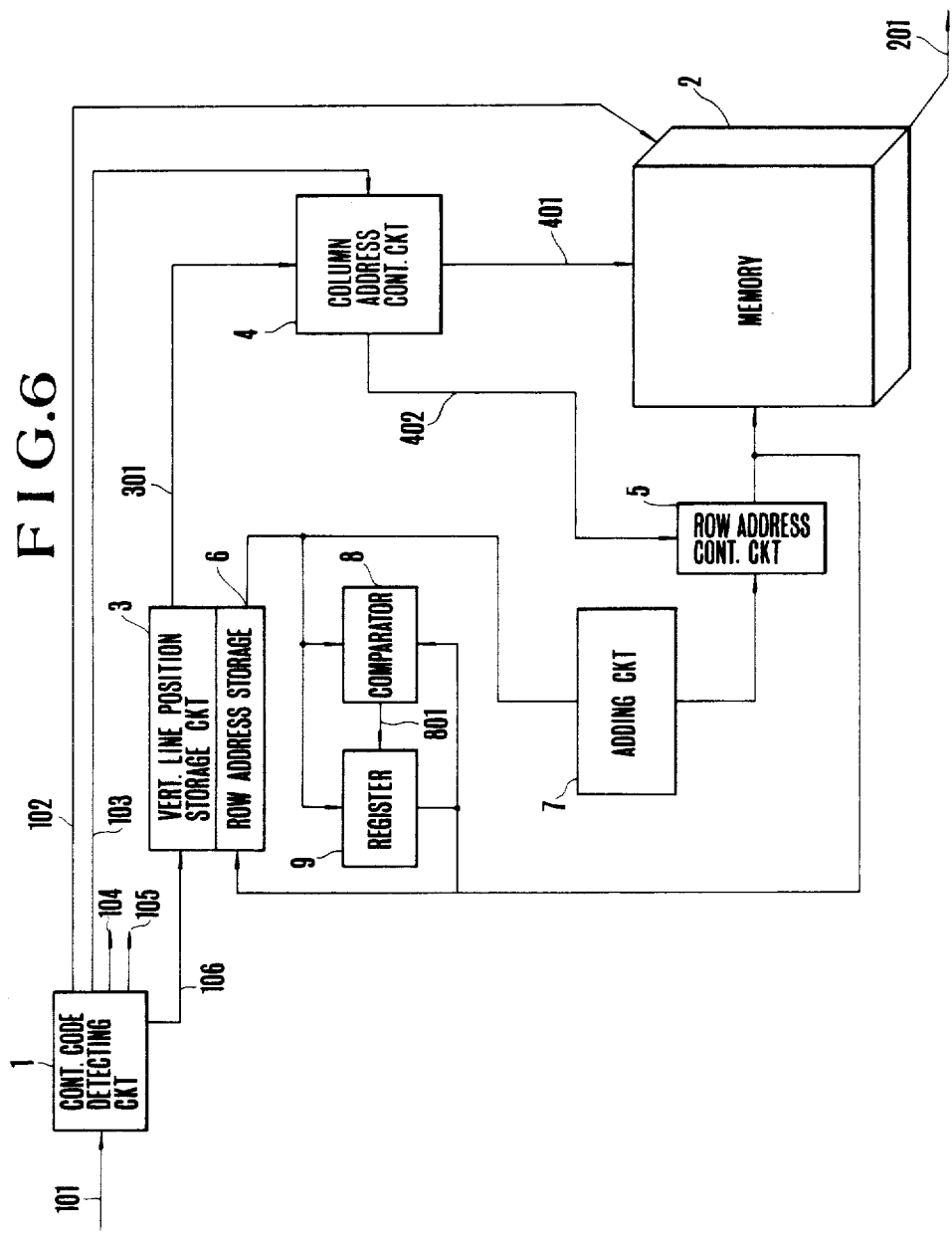
FIGS. 6 and 7 are block diagrams showing modifications of FIGS. 3 and 5, respectively.
Figure 7:
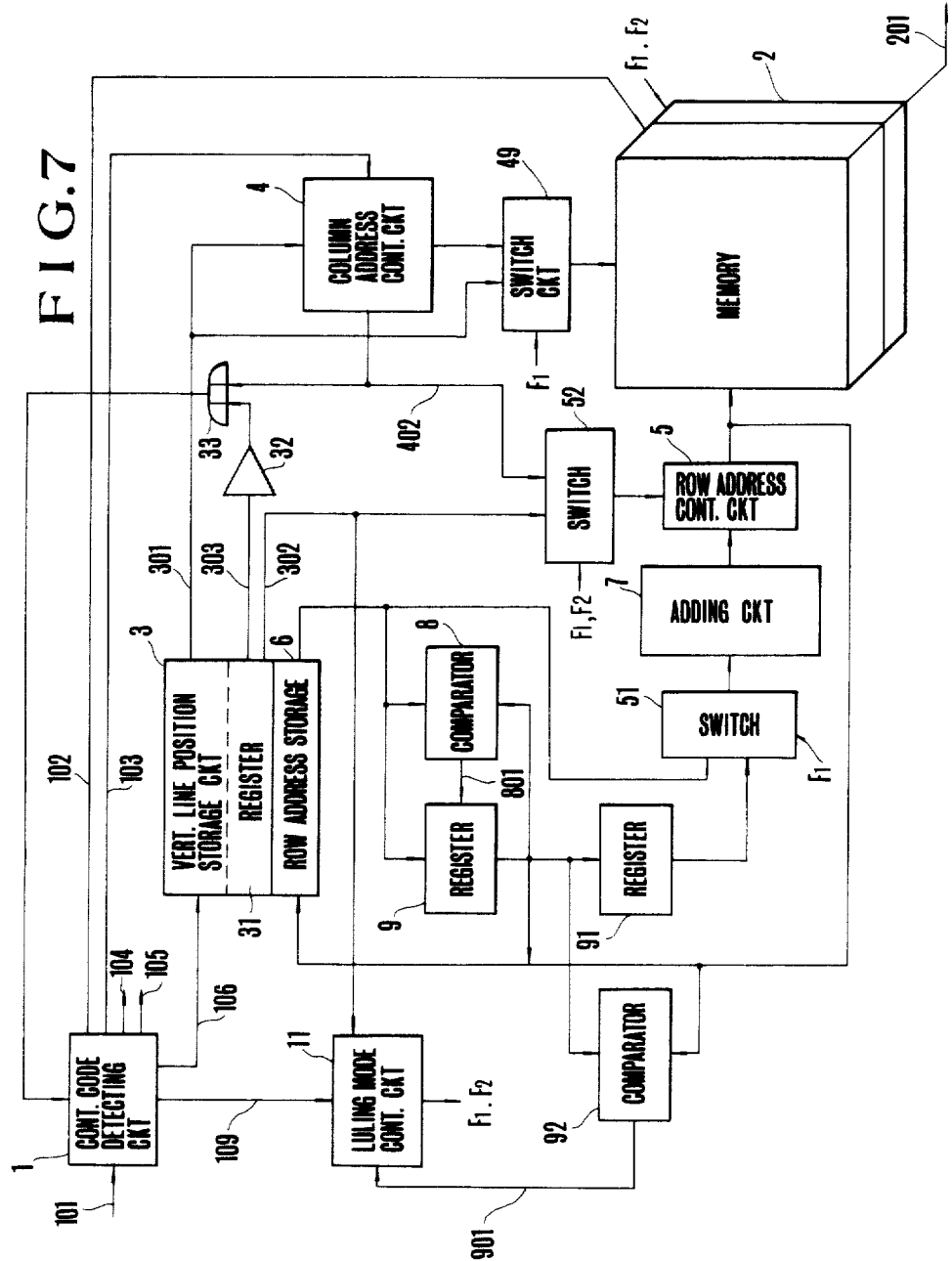

The circuit structure of FIGS. 3 and 5 may be modified as shown in FIGS. 6 and 7. In the embodiment of FIGS. 3 and 5, the row address of the row address control circuit 5 at the time of TAB signal detection is added to a predetermined number of line-spacings by adding circuit 7 before storing the initial value of the starting row of each field into the row address storage circuit 6, and for the starting row address of a field to be set intially in the row address control circuit 5, the value stored corresponding to the field in the row address storage circuit 6 is used. In contrast, in the embodiment of FIGS. 6 and 7, adding circuit 7 is disposed at the rear side of the row address storage circuit 6 instead of the front side, in which the row address of the row address control circuit 5 at the time of TAB signal detection is stored, and the value added by a predetermined number of line-spacings is intially set to the row address control circuit 5. The embodiment of FIGS. 6 and 7 only differs from that of FIGS. 3 and 5 in disposition of the adding circuit 7, and both systems function identically.

Another example of the circuit structure shown in FIG. 8 which serves for more simplified tabulation than the case of FIG. 1 will now be described.

In tabulation of FIG. 8, entry field laid out in the column direction has a common starting row address, and thus horizontal lines are ruled between the leftmost vertical line position and the rightmost vertical line position. Such tabulation can be accomplished by simpler circuit structure than that mentioned previously.

FIG. 9 shows an example of character strings for making the table shown in FIG. 8. This tabulation is basically the same as that of FIG. 2 with the following exception.

In tabulation of FIG. 1, horizontal lines are ruled only between some specific vertical lines. Therefore, entry of HL codes corresponding to each field (between vertical line positions) is necessary, and in the example of FIG. 2, horizontal lines are specified by a group of HL codes following a TAB code. In contrast, in the example of FIG. 9, each horizontal line is specified by a single HL code, as can be seen from the above-mentioned feature of tabulation shown in FIG. 8. More particularly, the HL code in the 12th character position specifies the ruling of a horizontal line between the leftmost line position (i.e. column 3) and the rightmost line position (i.e. column 19). The HL code in the 30th character position provides horizontal ruling information on row 2, and it is identical to that in the 12th character position for ruling a horizontal lying on row 1. Moreover, the HL code in the 63rd character position specifies the ruling of a horizontal line between the leftmost vertical line position (i.e column 3) to the rightmost vertical line position (i.e. column 19). In this case, the row number of the horizontal line is determined by calculating the row number next to the largest row number of the last rows of the fields arrayed between the vertical lines In this example, the largest last row of field 5 through field $F_8$ is row 4, thus the horizontal line is ruled on row 5.

Figure 10:
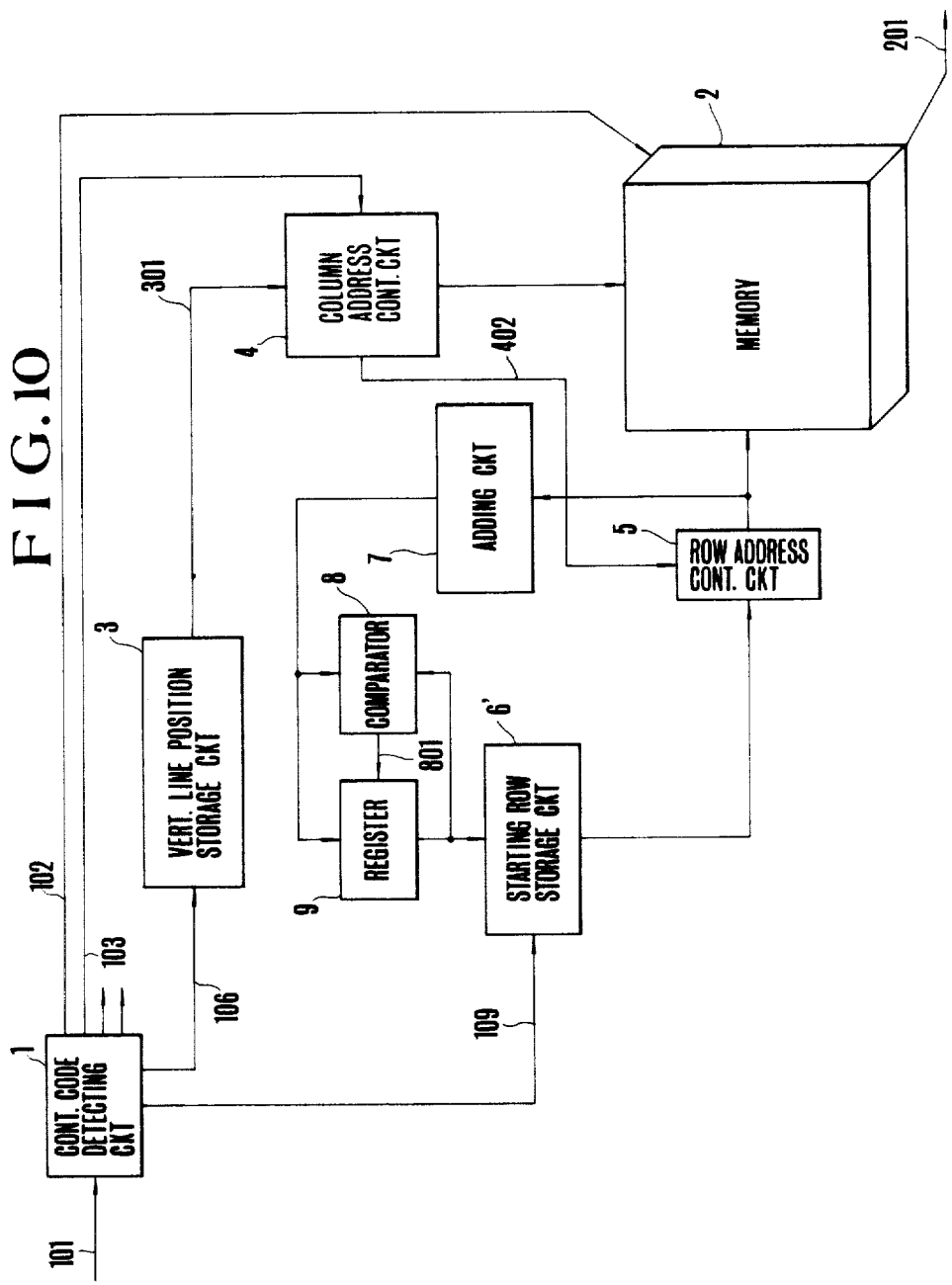
FIG. 10 is a block diagram of another tabulation system according to the present invention corresponding to the table shown in FIG. 8.

FIG. 10 shows a block diagram of the embodiment for making the table shown in FIG. 8. The circuit structure of FIG. 10 is basically different from that of FIG. 3 as follows. In the circuit structure of FIG. 3 for making a table having features as shown in FIG. 1, the starting row address of each field needs to be controlled individually, and row address storage circuit 6 is provided for storing starting row addresses corresponding to individual fields. In the circuit structure of FIG. 10, the row address storage circuit is replaced with a starting row storage circuit 6' which stores a single starting address. This arrangement is based on the feature of the table shown in FIG. 8 that fields laid out in the column direction have a common starting row. In the circuit structure of FIG. 10, the row address is controlled as follows. Row address control circuit 5 generates addresses corresponding to rows of a table to be tabulated, and increments the row address by 1 each time the line-spacing signal is sent out from column address control circuit 4, with the contents of the starting row storage circuit 6' being the starting row of each field. In doing this, when a TAB control signal is detected, the contents of the starting row storage circuit 6' are set again as the starting code of the next field. Comparator 8 compares the contents of the row address control circuit 5 added by the predetermined number of line-spacings by means of adding circuit 7 with the contents of register 9, and only if the former is larger than the latter, the contents of register 9 are updated by the signal on line 801 so that the maximum row address is obtained. Next, when an HL code is detected by the control code detecting circuit 1 and sent out over line 109, the maximum row address in register 9 is set to the starting row storage circuit 6, and this maximum address is used as the starting row address of succeeding fields. The components in FIG. 10 having the same reference numbers a those of FIG. 3 function identically, and memory 2 is written and read identically to the case of the embodiment of FIG. 3. The column address control circuit 4 is the same as that detailed in FIG. 4.

Figure 11:
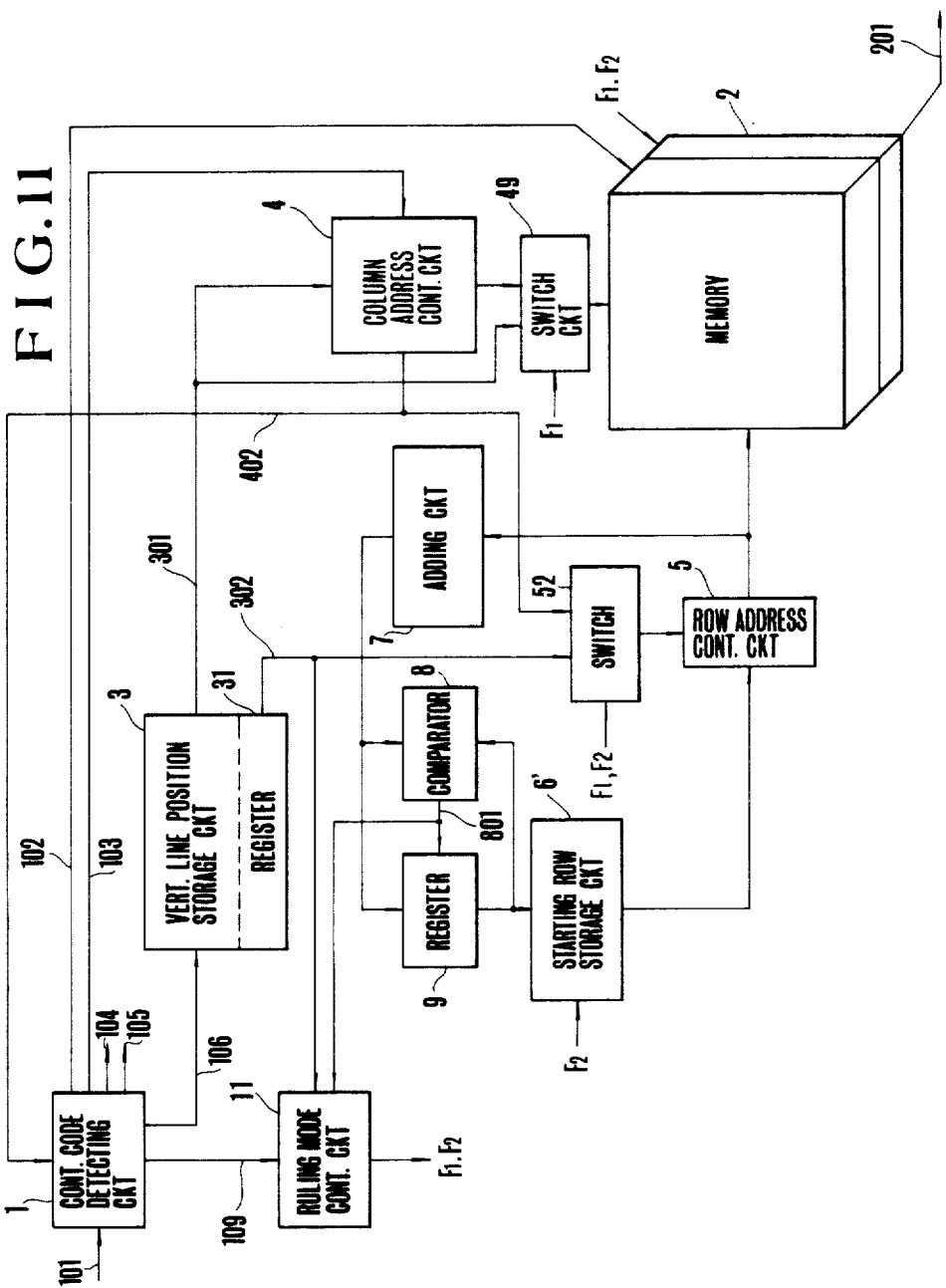
FIG. 11 is a block diagram based on that of FIG. 10 and added by the circuitries necessary for generating ruled lines shown in FIG. 8.

Generation of ruled lines will now be explained with reference to FIG. 11. The circuit structure of FIG. 11 is based on that of FIG. 10 and added by circuitries necessary for ruled line generation. In FIG. 11, the end mark is stored in part of the vertical line position storage circuit 3, and a register 31 is added for reading out the end mark signal over line 302. Ruling code control circuit 11 made up of two flipflops and a gate receives an HL code signal on line 104, causing the first flipflop to be set, and the system enters vertical ruling mode. The column address of a vertical line position is produced by reading out the contents of the vertical line position storage circuit 3 sequentially an repeatedly. For this, switch circuit 49 is switched to the left side, and signals on line 301 are directly used as the column direction address of memory 2. At this point of time, the starting row storage circuit 6 contains values before it is updated by the HL code to the maximum row address, and they are updated when the second flipflop in the ruling mode control circuit 11 is set. Row addresses of the row address control circuit 5 are counted by switching the normal line-spacing signal on line 402 to the end mark signal which signifies the last data of the vertical line position of the vertical line position storage circuit 3 on line 302. The above-mentioned operation will further be explained as follows. The row address starts with a row next to the row on which processing for vertical ruling has been completed in the previous vertical ruling mode. The column address generates the vertical line position address of each row sequentially, and the row address of the row address control circuit 5 is incremented by 1 each time all vertical positions from the left edge to the right edge are transferred. All vertical line positions for the next row are generated in the same way, and this operation is continued until comparator 8 detects that the contents of the row address control circuit 5 added by the predetermined number of line-spacings by means of adding circuit 5 are equal to the contents of register 9 and a signal is sent out on line 801. By the signal on line 801, the second flipflop in the ruling mode control circuit 11 is set, and the system enters horizontal ruling mode. In this mode, switch 49 is returned to the original position and the contents of the vertical line position storage circuit 3 are sent to the column address control circuit 4 sequentially, as usual. At this time the control code detecting circuit 1 generates pseudo synchronization signals on line 103. Therefore, the column address control circuit 4 generates addresses from the left-hand vertical line position to the right-hand vertical position minus one column of the field sequentially, and during this time, horizontal ruling information is written to the corresponding location of memory 2. When addresses have been generated up to the right-hand vertical line position minus one column, a line-spacing signal is produced on line 402, and the column direction address of the next field is then generated by the pseudo TAB signal sent out on line 105. The row address remains at the maximum row address at the time of completion of vertical ruling mode. After all fields have been processed, the second flipflop in the vertical ruling mode control circuit 11 is cleared by the end mark signal on line 302. Then horizontal ruling mode is terminated and usual character string array is restarted. Horizontal and vertical lines are written into memory 2 in the same way as explained in the embodiment of FIG. 5.

Although processing for the topmost horizontal line has not been explained, it can be understood as follows. The row address at which tabulation is started is initially set to the starting row storage circuit 6 and register 9 which stores the maximum row address (the set signal is not shown). The comparator 8 produces the signal on line 801 indicating that the contents of register 9 and starting row storage circuit 6 are equal, and as soon as the HL code is entered, the second flipflop in the ruling mode control circuit 11 is set to bring the system into horizontal ruling mode. Then, horizontal lines are ruled from the left-most vertical line position to the rightmost vertical line position in the same manner.

Figure 12:
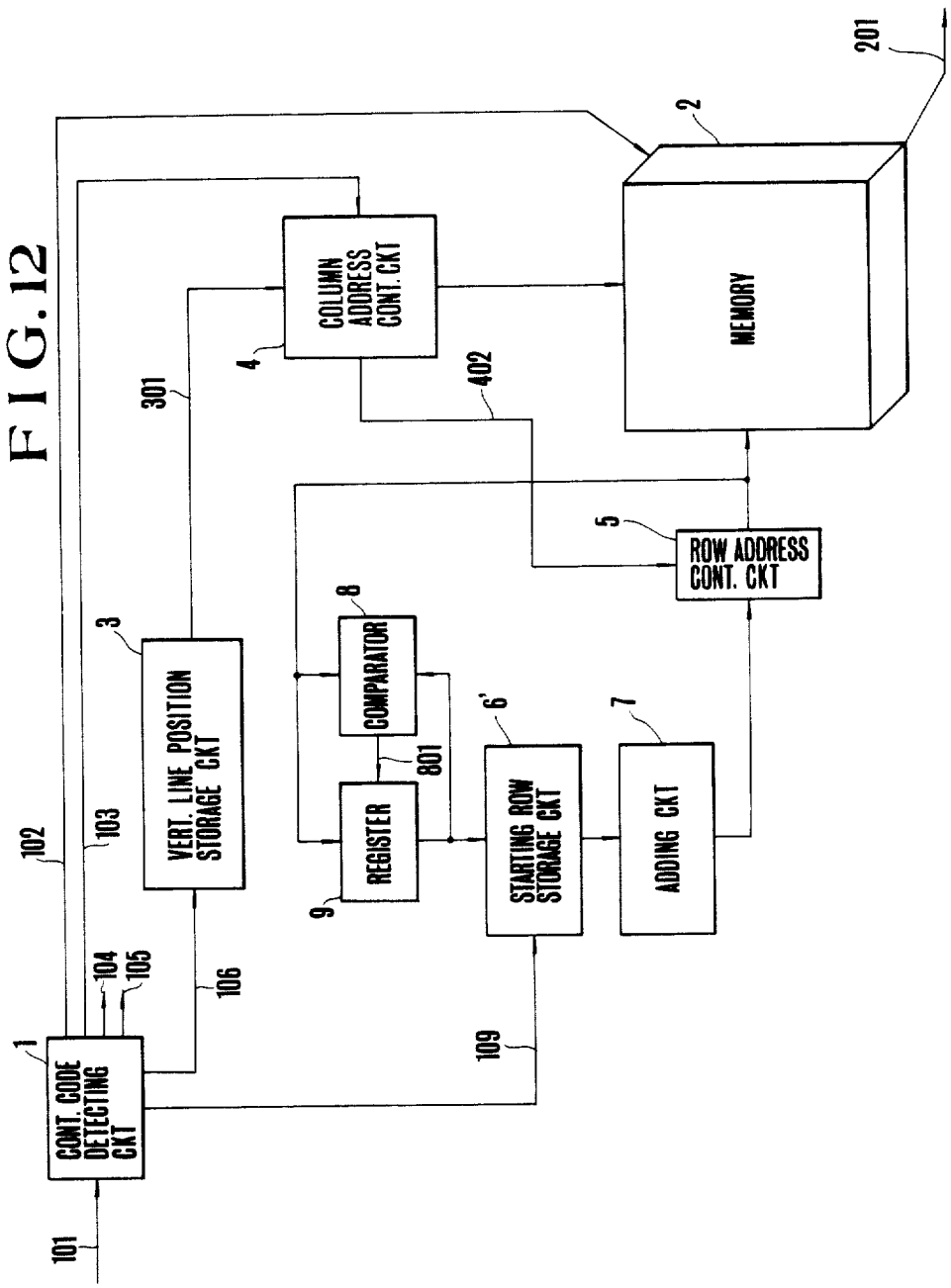

The embodiment of FIGS. 10 and 11 can be modified as shown in FIGS. 12 and 13. This is based on the same reason as that for modification shown in FIGS. 6 and 7 from the embodiment of FIGS. 3 and 5.

To sum up, a sophisticated tabulation for universal use as shown in FIG. 1 is prepared through the use of the circuit arrangements as exemplified and described in connection with FIGS. 3, 5, 6 and 7 whereas a simplified tabulation as shown in FIG. 8 is prepared through the use of the circuit arrangements as exemplified and described in connection with FIGS. 10, 11, 12 and 13.

In comparison of FIG. 3 embodiment with FIG. 5 embodiment, it should be understood that the FIG. 3 embodiment is modified to attain the FIG. 5 embodiment which is adapted to automatically generate the horizontal and vertical ruling lines. Specifically, added to the FIG. 5 embodiment are the register 31 for storing the end mark signal and the HL code corresponding to the respective vertical line positions, the ruling mode control circuit 11, the register 91 for storing a row address which is present immediately before the contents of register 9 is updated by the HL code to the maximum row address, the comparator 92 for detecting the termination of reading of the vertical ruled line, the switches 49, 51 and 52 for the switchover between the vertical ruling line mode and the horizontal ruling line mode, and the inverter 32 and OR gate 33 for detecting the presence or absence of the HL code.

In comparison of FIG. 3 embodiment with FIG. 10 embodiment, it will be appreciated that in the FIG. 3 embodiment, the row addresses for initiating the writing of the character series in the respective fields aligned in column are not always identical and some horizontal ruled lines associated with specified fields can be ruled but some horizontal ruled lines can be omitted. Thus, it is necessary to monitor the initiation row address for each of the fields. To this end, the row address storage 6 stores the initiation row address corresponding to each of the fields. In contrast therewith, in accordance with the FIG. 10 embodiment, the writing of the character series in the respective fields aligned in column is initiated from the same row address and the horizontal ruled lines are uniform for all the fields. Therefore, the FIG. 10 embodiment comprises, in place of the row address storage 6 of the FIG. 5 embodiment, the starting row storage circuit 6' for storing only one initiation row address.

Further, when comparing FIG. 10 embodiment with FIG. 11 embodiment, it will be seen that the FIG. 10 embodiment is modified to reach the FIG. 11 embodiment which is adapted to automatically generate the ruled line. Thus, the FIG. 11 embodiment has additional components of the register 31 for storing the end mark signal, the ruling mode control circuit 11 and the switches 49 and 52 for the switchover between the vertical ruling line mode and the horizontal ruling line mode.

Moreover, comparison of FIG. 3 embodiment with FIG. 6 embodiment will indicates the different location of the adding circuit 7. The adding circuit 7 is subsequent to the row address control circuit 5 in the FIG. 3 embodiment, while preceding the circuit 5 in the FIG. 6 embodiment. This similarity holds true for comparison of FIG. 5 embodiment with FIG. 7 embodiment, comparison of FIG. 10 embodiment with FIG. 12 embodiment, and comparison of FIG. 11 embodiment with FIG. 13 embodiment.

It is apparent that various processings accomplished in prior art word processors are combined in practical tabulation processing, such as spacing one or two characters at both vertical lines of each field, spacing few characters at the beginning of each field and paragraph, justifying a character string at the end of each row, and interrupting tabulation for page renewal. The present invention is not limited to the specific arrangements of the embodiments.

What is claimed is:

1. A tabulation system for delivering column and row address information to a medium, said column and row information providing for the tabulation of serial character strings and horizontal and vertical ruled lines to produce a selected array thereof in response to input coded information defining said array, said system comprising detecting means responsive to said input coded information for providing first data information concerning the positions of said vertical and horizontal ruled lines and for providing second data information concerning said serial character strings to said medium;

means responsive to said first data information concerning said vertical ruled lines for storing vertical line position information;

means responsive to said first data information concerning said horizontal ruled lines for storing row address information corresponding to individual fields of said array between said vertical lines position;

column address control means responsive to said stored vertical line position information and row address control means responsive to said stored row address information for providing column and row address information, respectively, to said medium to permit the arraying of one or more serial character strings in one or more selected fields between adjacent vertical line positions, each selected character string being arranged in rows, a first portion of said character string starting from a row address corresponding to the first row of said selected field and the rest of said character string continuing on successive rows between the same vertical line positions each time one row has been filled;

means connected to said row address control means and responsive to a current row address for updating said current row address by adding a predetermined number of line spacings each time an end of a field is indicated by said input coded information and for supplying said updated row address to said row address storing means;

maximum row address determining means responsive to the last row address stored in said row address storing means, said last row address corresponding to the last row address of an individual field and further responsive to said first data information concerning horizontal line position corresponding to the individual field for determining the maximum row address of said corresponding field, said maximum row address determining mean including comparator means and register means, said comparator means responsive to said last row address of said row address storing means and the contents of said register means for updating said contents of said register means to obtain the maximum row address for storage in said register means when the last-row address of the row address storing means is larger than the contents on the register means and for supply to said row address storing means.

2. A tabulation system according to claim 1 and further including
vertical ruled line arraying means responsive to said stored vertical line position information and to said stored row address information for supplying to said medium sequentially arrayed vertical rules line information in all vertical lime positions starting from the maximum row address stored in the register means before it has been updated; and
horizontal rules line arraying means responsive to row address storage information for supplying to said medium arrayed horizontal ruled line information for use between the vertical rules lines at the updated maximum row addresses in response to the detection of a horizontal line code by said detecting means.

3. A tabulation system according to claim 1 or 2 wherein the row address storing means comprises a row address storage (6) for storing the initial row address corresponding to each of the fields.

4. A tabulation system according to claim 1 or 2 wherein the row address storing means comprises a starting row storage circuit (6') for storing only one initial row address.

* * * * *

UNITED STATES PATENT AND TRADEMARK OFFICE
CERTIFICATE OF CORRECTION

PATENT NO. : 4,495,600
DATED : January 22, 1985
INVENTOR(S) : Y. Kikuchi, M. Shutoh, H. Miyai, H. Itoh It is certified that error appears in the above—identified patent and that said Letters Patent is hereby corrected as shown below:

Col. 2, l. 17: change "circuit of" to --circuit 4 of--

Col. 2, l. 31: change "EMBODIMENT" to --EMBODIMENTS--

Col. 2, l. 44-5: after "convenience" insert --,--

Col. 3, l. 24: after "columns" delete --)--

Col. 3, l. 51: after "$X_9XX$" insert --...--

Col. 3, l. 62: after "$F_5$" insert --,--

Col. 5, l. 25-6: change "sotrage" to --storage--

Col. 7, l. 6: change "14 and 14;" to --14 and 15;--

Col. 7, l. 64: change "Fig. 2 array" to --Fig. 2, an array--

Col. 8, l. 9: delete "added"

Col. 8, l. 47: after "line" delete --,--  (first occurrence)

UNITED STATES PATENT AND TRADEMARK OFFICE
CERTIFICATE OF CORRECTION

PATENT NO. : 4,495,600
DATED : January 22, 1985
INVENTOR(S) : Y. Kikuchi et al

It is certified that error appears in the above—identified patent and that said Letters Patent is hereby corrected as shown below:

```
Col. 10, l. 47: change "entry field" to --every field--

Col. 11, l. 11: after "lines" insert--.--

Col. 11, l. 50: change "numbers a" to --numbers as--

Col. 11, l. 67: change "an" to --and--

Col. 12, l. 66: change "rightmost" to --right-most--

Col. 13, l. 57: change "indicates" to --indicate--

Cl. 1, col. 14, l. 66: change "last-row" to --last row--
```

Signed and Sealed this

*Eighth* Day of *October 1985*

[SEAL]

*Attest:*

*Attesting Officer*

DONALD J. QUIGG

*Commissioner of Patents and Trademarks—Designate*